United States Patent
Ulrici et al.

(10) Patent No.: US 10,346,957 B2
(45) Date of Patent: Jul. 9, 2019

(54) METHOD FOR IMAGE IMPROVEMENT OF IMAGE DATA FROM A DENTAL IMAGE GENERATION SYSTEM

(71) Applicant: DENTSPLY SIRONA inc., York, PA (US)

(72) Inventors: Johannes Ulrici, Darmstadt (DE); Ulrich Schulze-Ganzlin, Lorsch (DE); Ciamak Abkai, Heddesheim (DE)

(73) Assignee: DENTSPLY SIRONA Inc., York, PA (US)

( * ) Notice: Subject to any disclaimer, the term of this patent is extended or adjusted under 35 U.S.C. 154(b) by 0 days.

(21) Appl. No.: 15/571,073

(22) PCT Filed: May 9, 2016

(86) PCT No.: PCT/EP2016/060259
§ 371 (c)(1),
(2) Date: Nov. 1, 2017

(87) PCT Pub. No.: WO2016/177905
PCT Pub. Date: Nov. 10, 2016

(65) Prior Publication Data
US 2018/0165800 A1    Jun. 14, 2018

(30) Foreign Application Priority Data
May 7, 2015  (DE) .................. 10 2015 208 555

(51) Int. Cl.
*G06T 5/00* (2006.01)
*G06T 11/00* (2006.01)
(Continued)

(52) U.S. Cl.
CPC ............ *G06T 5/006* (2013.01); *G06T 7/0012* (2013.01); *G06T 7/30* (2017.01); *G06T 11/005* (2013.01);
(Continued)

(58) Field of Classification Search
CPC ......... G06T 5/006; G06T 7/30; G06T 11/005; G06T 7/0012; G06T 2207/30036;
(Continued)

(56) References Cited

U.S. PATENT DOCUMENTS

| 2007/0040854 A1 | 2/2007 | Lievin et al. |
| 2013/0114799 A1* | 5/2013 | Yamakawa ............. A61B 6/14 378/207 |

(Continued)

FOREIGN PATENT DOCUMENTS

| DE | 10338145 A1 | 3/2005 |
| EP | 2570080 A1 | 3/2013 |
| WO | 2014008613 A1 | 1/2014 |

OTHER PUBLICATIONS

International Search Report and Written Opinion for PCT/EP2016/060259 dated Aug. 12, 2016 (English translation).
(Continued)

*Primary Examiner* — Brenda C Bernardi
(74) *Attorney, Agent, or Firm* — Dentsply Sirona Inc.

(57) ABSTRACT

In a method for image enhancement of image data of a dental image generation system, comprising a first image generating unit (205, 210) for producing two-dimensional image data and a second image generating unit (250, 255) for producing three-dimensional image data, wherein for an object to be examined (220, 222) the image generation system provides both two-dimensional image data and three-dimensional image data, it is in particular provided that the two-dimensional image data and the three-dimensional image data are merged in such a way that the image quality and/or the information content of the two-dimensional image data or of the three-dimensional image data is improved.

16 Claims, 3 Drawing Sheets

(51) Int. Cl.
  *G06T 7/30* (2017.01)
  *G06T 7/00* (2017.01)
  *G06T 3/40* (2006.01)
(52) U.S. Cl.
  CPC ........ *G06T 3/4053* (2013.01); *G06T 2200/04* (2013.01); *G06T 2207/10072* (2013.01); *G06T 2207/10116* (2013.01); *G06T 2207/30036* (2013.01)
(58) Field of Classification Search
  CPC ....... G06T 2200/04; G06T 2207/10072; G06T 2207/10116; G06T 3/4053
  See application file for complete search history.

(56) References Cited

U.S. PATENT DOCUMENTS

| | | | |
|---|---|---|---|
| 2014/0270439 A1* | 9/2014 | Chen | G06T 11/006 382/131 |
| 2015/0227679 A1* | 8/2015 | Kamer | G06F 19/12 703/11 |

OTHER PUBLICATIONS

International Preliminary Report on Patentability for PCT/EP2016/060259 dated Nov. 7, 2017 (English translation).
German Office Action dated Jan. 20, 2016 (English translation).
P. Markelj, D. Tomazevic, B. Likar, and F. Pernus, "A review of 3D/2D registration methods for image-guided interventions," Medical Image Analysis, vol. in press, corrected proof.
J. B. Antoine Maintz and Max A. Viergever, "A survey of medical image registration," Medical Image Analysis (1998), vol. 2, No. 1, pp. 1-36.

* cited by examiner

METHOD FOR IMAGE IMPROVEMENT OF IMAGE DATA FROM A DENTAL IMAGE GENERATION SYSTEM

TECHNICAL FIELD

The invention relates to image generation or image display systems used in dental medicine, and in particular to a method for image enhancement of image data obtained using such systems. The invention further relates to a computer program, a machine-readable data carrier for storing the computer program and an image generation or image display system, by means of which the method according to the invention can be implemented.

STATE OF THE ART

Modern image generation systems, which are used in particular in dental medicine or dentistry, produce image data or volume data, which represent the object to be imaged as a three-dimensional object (3D) and have to be processed and displayed for the user or, respectively, the viewer. It has since become possible to use preoperatively or intraoperatively obtained 3D image data of the object to be treated, for example a human jaw or tooth, to make a diagnosis, and also to plan out an upcoming medical procedure.

Digital volume tomography (DVT), which is known per se, is already being used in dentistry. It makes use of a cone-shaped beam and represents a three-dimensional, imaging tomography method using x-rays, with which sectional views are generated. As in the case of digital radiography, DVT also uses an x-ray tube and an opposite digital image sensor or detector with an x-ray-sensitive scintillator layer, which rotate around a lying, sitting or standing patient. The x-ray tube, which generally rotates 180 to 360 degrees with a fan angle, emits a cone-shaped, usually pulsed, x-ray beam.

While the x-ray tube is revolving, a plurality of two-dimensional tomograms (i.e. individual slices from a tomographic reconstruction) is acquired, and a 3D image data set is obtained from these x-ray images. The x-ray radiation penetrates the three-dimensional investigation area and produces an attenuated grayscale x-ray image as a 2D x-ray projection.

The 3D image data is usually displayed on conventional flat screens and therefore in only two dimensions (2D). From surgery, however, is known the technique of simultaneously displaying three orthogonal sections through the object, each in two dimensions. With the aid of a pointer device, the operator has the option of specifying the respective position of the orthogonal sections or the depth of the sections. Another display option is the projection of the 3D image data onto a defined plane and a subsequent 2D representation of this plane.

The disadvantage of the known methods is that detailed information is lost in every projection of 3D image data onto such a plane, because the individual volume information is averaged across said beam cone in the direction of the projection. As a result, volume information that does not belong to the respective object to be examined is included in said 2D representation as well.

A method for displaying 3D image data of an image generation system in consideration here has become known from DE 103 38 145 A1, in which a projection with relatively low spatial resolution is displayed as a total image, by means of which the viewer can be provided with an overview. The user is also given the option to select a section of the image from the projection and display a detailed image of higher quality in this section of the image. The user can thus identify where he is within the object, and also receives additional detailed information regarding the selected section of the image.

A subarea is thus selected from said projection and a detail image is generated within the subarea, whereby the image is generated by directly or indirectly accessing the stored data of the image data. The detail image is characterized in that it comprises information content that is different from that of the projection, whereby the increased information content can relate, for example, to the resolution and/or the viewing angle. The detail image is then displayed on the screen within the framework of the subarea selected by the user. The user thus sees a picture-in-picture.

The two-dimensional (2D) image data in consideration is generated radiographically, for example, by taking intraorally generated images by means of an x-ray detector disposed inside the oral cavity of the respective patient and an x-ray source disposed outside the oral cavity.

The task of the present invention is to specify a method for improving the image quality or display quality, or increasing the information content, of existing 2D and/or 3D image data, by means of which in particular structures or objects within the beam path of the radiation source that affect or distort the generation of the image data can be subtracted from the available image data later.

PRESENTATION OF THE INVENTION

In particular in the field of dental medicine, the underlying idea of the invention is, on the one hand, to combine, i.e. merge, 2D image data generated by intraoral radiography (a so-called "IO image") with 3D image data generated, for example, by means of said digital volume tomography (DVT), in particular for the purpose of improving the image quality. In particular the image quality or the display quality of the 2D image data can be improved by merging. On the other hand, the underlying idea is also to conversely combine or merge 3D image data generated with said digital volume tomography (DVT), for example, with 2D image data generated by means of intraoral radiography in such a way that in particular the image quality or the display quality of the 3D image data is improved.

The likewise in particular possible improvement in the image quality of 3D image data is obtained in particular from the, with respect to the 3D image data, relatively higher resolution of the 2D image data, as well as, in the case of the 2D image data, in particular due to the, with respect to the 2D image data, higher depth resolution of the 3D image data.

It should further be possible to draw conclusions about the quality of the respective other image data set from one of said image data sets, to then perform appropriate changes or corrections to the image data to improve the image quality as needed.

The method according to the invention for processing image data of a dental image generation system, in particular for improving the image quality, which comprises a first image generating unit for generating two-dimensional image data and a second image generating unit for generating three-dimensional image data, wherein the image generation system provides both two-dimensional image data and three-dimensional image data for an object to be examined, in particular proposes to merge said intraorally produced 2D x-ray images with 3D images obtained by means of DVT on the basis of geometric imaging conditions in as application-focused a manner as is possible and to visualize the combined information or data resulting from the merging in such a way that added diagnostic value is created for the user, in particular for the treating physician.

It must be noted that the two terms "first image generating unit" and "second image generating unit" are to be understood only in a functional sense, and that these two functional units can also be physically realized in one single image generation unit, i.e. they do not necessarily have to be configured or arranged in a functionally or spatially separated manner. One of these two image generating units can thus be realized by means of a modified operating mode of the respective other image generating unit. Furthermore, the two image generating units do not have to be part of the same image generation system, but can instead be disposed or used at different locations, for example in different dental practices, and the respectively generated image data can be combined later in an image generation system.

It must also be noted that said image enhancement can refer to an improvement in the image quality, e.g. image sharpness, image resolution, image contrast and elimination or reduction of image artifacts, or an improvement in the information content of the image data, e.g. the depth information, information regarding the orthogonality of the images, or information regarding possible distortion corrections of the image contents.

Said merging of the 2D and 3D image data takes place geometrically, preferably by means of the per se known method of 2D/3D registration (P. Markelj, D. Tomazevic, B. Likar, and F. Pernus, "A review of 3D/2D registration methods for image-guided interventions," Medical Image Analysis, Vol. in press, corrected proof.), which preferably takes place in an automated manner. By means of a perspectively correct 2D/3D registration, the relationship between a 2D acquisition geometry (i.e. the position and orientation of the detector and the source) is calculated with reference to the 3D object.

If this relationship is known, it can be determined which objects in the beam path from a source to a given image point (pixel) make what contribution. In other words, based on the 3D information, every value along the beam path can be set at a specific depth in relation to the final projection image. This merging, modified according to the invention and referred to in the following as profile depth variation, can be performed manually by the user; for example, by shifting a virtual detector layer in a perspectively correct manner and parallel to the identified position of the detector to assess which contributions have an information content. Automatic shifting or location of the layer (of the profile) with the most significant contribution (e.g. tooth enamel) is possible as well. Location of a layer with the most significant contribution can preferably be performed by means of statistical correlation, e.g. cross correlation or mutual information.

For the geometric merging of the two-dimensional and the three-dimensional image data, as described below by reference to design examples, image points in a three-dimensional (3D) space can be allocated to image points of a two-dimensional (2D) projection surface. Said image points in the 2D space and said image points in the 3D space can also represent points on image areas, whereby planes, curved surfaces or even individual points or point clouds can be included. The image areas are preferably flat surfaces.

A profile depth can thus be calculated using a cited method of profile depth variation according to the relationship $z_0$-$z_1$-$z_2$-$z_3$, with image planes $z_1$, $z_2$, $z_3$, etc. and a detector plane $z_0$. For a specific object to be acquired, such a profile depth can for example be $z_0$-$z_i$ with i=1, 2 or 3, or, in the case of a plurality of objects arranged at different distances from the detector plane $z_0$, it can for example be $z_0$-$z_i$-$z_j$ with i, j=1, 2 or 3 and with the condition i≠j.

It can further be provided that at least one image area with maximum overlap or coincidence with said two-dimensional projection surface is identified in the three-dimensional space with the aid of a quality measure, preferably by means of an optimizer. Said quality measure can be formed by calculating an image difference, e.g. by calculating a smallest quadratic distance or a gradient difference. It must be emphasized here that the beam path described herein is preferably a "virtual" beam path or a "virtual" geometric arrangement of radiation source and detector, because, after generation of the 2D and 3D image data in consideration here or the processing according to the invention of said image data, there is no real object located in the beam path, but only the image (3D image data) of a respective object generated by said image generating unit. A herein described radiation source and an image generating unit are therefore also only purely virtual in relation to said image elements.

It can further be provided that, in the identification of an image area with maximum overlap or coincidence at a specific distance in said virtual beam path between a radiation source and an image generating unit of an image generation system in consideration here, image elements are evaluated, wherein an image element with a highest contribution or a specific group of image elements with a highest contribution is preferably identified in accordance with a quality measure. Said image element can be a so-called "voxel," i.e. a volume-like grid point or image point in a three-dimensional grid.

As a result, the informative value of an IO image can be improved diagnostically, because, since these anatomical structures are known in the DVT with lower resolution, but with increased depth information, the spatial position and/or the position of a tooth root, for example, can be placed into a 3D context. The image data can advantageously be merged in a common data space, whereby the merging can be performed either in a 2D or in a 3D data space. The merging of 2D image data is thus preferably performed in a 3D data space, whereas the merging of 3D image data is preferably performed in a 2D data space.

A merging in 2D is possible if the IO image content (FIG. 1, reference numeral 105), e.g. for a specific depth (FIG. 1, "Z3"), is subtracted from a virtual projection of all volume elements located in a specific beam path prior to said volume depth (FIG. 1, "Z3"). Interfering objects are thereby removed from the IO image. This form of merging, which relates to the resulting image on the 2D detector, can integrate additional depth information into an image that otherwise does not contain depth information. The additional information can preferably be displayed in color.

A merging in 3D is possible if, with the aid of a filtered back projection, the IO image content for a specific beam path (FIG. 1, reference numeral 110 and FIG. 1, reference numeral 105) results in an improvement of the resolution of the volume elements in this beam path. This form of merging results in corresponding improvements in the 3D information by increasing the resolution.

For IO images that are generated non-orthogonally with respect to the optical axis of the beam being used, the method according to the invention also allows the later performance of a perspective correction on the basis of an image geometry calculated from the 3D image data, even if the direction of the profile depth of individual depth layers in this imaging situation is no longer arranged or aligned parallel to the detector or sensor.

The method according to the invention also allows a later correction of 3D image data (e.g. DVT), by merging this data with 2D image data (e.g. IO images) in order to improve the image quality of the 3D image data. At least in the area of the object or structure to be acquired, the 2D image data, which is relatively high-resolution compared to the 3D data, can thus be merged with the 3D image data in such a way that the object or the structure can be displayed at a higher-resolution later, whereby the advantage of the spatial resolution of the 3D data continues to exist.

Therefore, with the method according to the invention, in particular anatomical structures such as tooth roots, periodontal gaps or the like, which are displayed very clearly and at high resolution but without spatial information in an IO image, can be displayed or examined with both high resolution and spatial depth. Thus, for example, it can be determined or identified whether a particular tooth root is positioned proximally or distally in the oral cavity of a patient. It is furthermore possible to perform precise measurements otherwise not possible in this context, because the high-resolution position of the root tip, for example, can be placed into a 3D context and the length of the root canal can thus be determined not in a 2D projection, but rather in a 3D space with improved spatial resolution.

In the method according to the invention, it can further be provided that at least one structure, present during image generation in at least one image area with a specific profile depth and influencing the beam, is subtracted from the two-dimensional image data later using the three-dimensional image data. Structures, which affect the generation of said IO image for an object to be examined or distort the image of the object to be examined, or other objects, which impair the image quality of the IO image, located in the beam cone, can consequently be extracted or deleted from the already existing IO image data later.

In the method according to the invention, it can also be provided that a tilting of the radiation detector relative to the optical axis of the beam produced by the radiation source present during image generation is corrected later using a perspective correction on the basis of three-dimensional image data. Imaging conditions that are unfavorable for the image quality of said IO image can thus be corrected, preferably later.

In the method according to the invention, it can further be provided that said image area or group of said image areas of a three-dimensional image represented by three-dimensional image data, which provides a maximum contribution to a two-dimensional image, is used as the measuring space to perform true-to-scale measurements in the two-dimensional image.

In the method according to the invention, it can also be provided that three-dimensional image data is merged with higher-resolution two-dimensional image data, in order to improve the spatial resolution of the three-dimensional image data perpendicular to the projection direction.

It must be noted that said 2D image data preferably contains x-ray projection images without spatial reference and said 3D image data preferably contains spatial location information, so that every image point of the 3D image data can be uniquely assigned to a 3D spatial point.

It must additionally be noted that said 2D image data and 3D image data can also be surface data, or can originate from other modalities, e.g. object surfaces correspondingly acquired from layered tomographic images, from orthopantomograms (PAN), from MRI scans, from optical surface images (face scans), from DVT images or from CT scans.

Said merging of the two-dimensional image data and the three-dimensional image data can be performed by means of blending, addition, differentiation, by weighted addition or subtraction, or by a combination of said operators or by similar operators. Such basic operators can be implemented cost-effectively and with relatively low computing power. Said blending can additionally be a gradient-based blending or (un)sharp masking.

It must be emphasized that the method according to the invention depends on the type of beams used for acquiring said 2D image data and/or 3D image data. Reference is made only by way of example to methods known per se from the fields of x-ray or nuclear diagnostics, e.g. nuclear spin tomography (MRI), or other diagnostic methods such as ultrasonic diagnostics, dental diagnostics using 3D surface scanning, or diagnostic 3D methods that are based on the use or application of spatial (e.g. intraoral) markers, e.g. metallic markers additionally applied to teeth, or existing tooth structures such as fillings, inlays, onlays or the like.

The computer program according to the invention is configured to perform every step of the method, in particular when it is executed on a computer. It allows the implementation of the method according to the invention in a conventional dental image generation system, without the need to perform structural modifications on the system. The machine-readable data carrier, on which the computer program according to the invention is stored, is provided for this purpose. A dental image generation system according to the invention, which is configured to perform an image generation or image display by means of the method according to the invention, is obtained by installing the computer program according to the invention onto a dental image generation system.

DESIGN EXAMPLES

Figure 1:
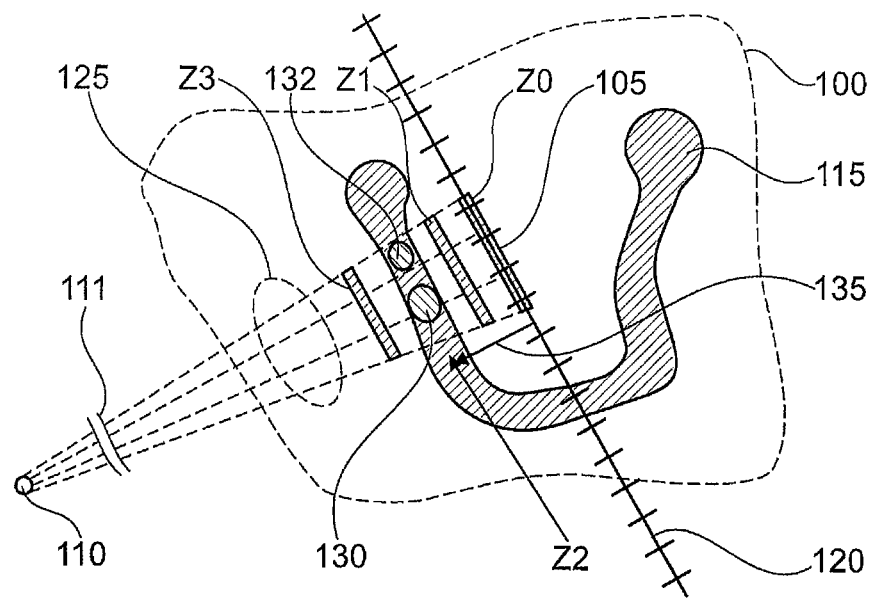
FIG. 1 shows a geometric measuring arrangement for enabling a profile depth variation calculation according to the invention.

FIG. 1 schematically shows the perspective geometry, i.e. the projection situation, when taking an intraorally-generated 2D image ("IO-image") by means of an x-ray detector 105 disposed inside the oral cavity 100 of a patient and an x-ray source 110 disposed outside the oral cavity 100. In accordance with the line interruption 111, the distance of the x-ray source 110 is not depicted to scale and is in reality disposed considerably further away from the detector 105. In the present case, the oral cavity 100 is indicated in a plan view of an only schematically represented mandibular arch 115. The spatial position of the detector plane in this example corresponds approximately to the detector plane 120, which for simplification is shown here to be flat, with a constant radiation intensity, which will in reality be curved in accordance with the spherical propagation of the beam or the beam cone 125, but at a relatively large distance from the detector 105, which, as achieved here with reference to the line interruption 111, is degraded in the present design example to a depicted straight line 120. But, it must be noted that the detector plane 120 in modern flat-image detectors is designed to be straight.

There are also special detectors, however, in which the detector plane is designed as a curved surface. The present invention can be used for the last mentioned detectors as well.

In FIG. 1, two teeth 130, 132, which represent the actual examination objects in the present diagnostic scenario and which are therefore to be acquired radiographically with the highest possible image quality, are additionally disposed in the irradiated region of the mandibular arch 115.

For the two objects 130, 132 to be examined in the present case, the three image planes z1, z2 and z3 and the detector plane z0, depicted in FIG. 1 only by way of example, result in a profile depth z2 indicated by the arrow 135 in FIG. 1, and consequently a corresponding profile depth variation of z0-z2 in the detector plane z0.

A merging of the respective image plane or layer z0, z1, z2 or z3 is possible on the basis of the image data resulting from a DVT investigation (see FIG. 2) via a perspectively correct displacement, whereby the sum of the contributions from the IO geometry emerges as a logarithmic composite image. The layer z2 with the maximum overlap with the medical object to be examined, i.e. the structure, in the present design example the two teeth 130, 132 or the row of teeth formed by these teeth 130, 132, which, due to the radiation absorption, provides a maximum image contribution, can therefore be located automatically by means of a per se known optimizer. In doing so, voxels located by means of a global search, for example, at a specific distance delta-V in the beam path between the radiation source 110 and the detector 105 are evaluated. As is known, a "voxel" (a combination of volumetric and pixel) is a volume-like grid point or image point in a three-dimensional grid. Delta_V can, for example, correspond to half the size of a voxel. In this analysis, the voxel with the highest contribution, or a specific group of voxels with the highest contribution, can be identified. The position of the voxel or the average position of the voxel group thus corresponds to the sought-for profile depth. Instead of said global search, it is generally possible to use any other solution from the class of optimization problems, e.g. the per se known conjugate gradient method.

As outlined in the following, the described method of profile depth variation is used according to the invention for the image quality-improving correction of the 2D or 3D image data in consideration here. In a perspective view, a two-dimensional IO image assumes a position along the depicted beam cone 125 that corresponds to the actual imaging position, i.e. the generated IO image corresponds to a view in the detector plane 120 of the detector 105 in the oral cavity 100. Since the resulting x-ray image in this plane 120 corresponds to an accumulation or integration of all the radiation absorptions along the x-ray beam 125 occurring locally at the layers z1 to z3, for example, the user or the treating physician can correct the IO image by merging the two-dimensional IO image data with additionally available three-dimensional image data (e.g. said DVT data) using said profile depth variation, so that the image quality of the IO image is improved considerably later.

A structure (bone structure, tooth replacement or the like), which during imaging or data acquisition is present in the layer z1 and/or the layer z3, for example, and absorbs the x-ray beam, can thus be subtracted from the IO image data. As a result, the data of the two teeth 130, 132 measured in the layer z2 is corrected accordingly, which improves the image quality thereof considerably. Also for a tilting of the detector relative to the optical axis of the beam 125 present during imaging, a corresponding perspective correction can be performed later, as a result of which the image quality of the IO image is likewise improved considerably.

Conversely, the method described here allows a correction of 3D image data (e.g. DVT), by merging this data with 2D image data (e.g. IO images) in order to improve the image quality of the 3D image data. At least in the area of the object to be acquired or the structure to be acquired, the 2D image data, which is relatively high-resolution compared to the 3D data, can thus be merged with the 3D image data in such a way that the object or the structure can later be displayed at a higher-resolution, whereby the advantage of the spatial resolution of the 3D data continues to exist. It must be noted that the typical (lateral) measurement resolution for the 2D image data in consideration here is about 10-20 µm, in contrast to a measurement resolution of typically about 100-150 µm for 3D image data.

It must be noted that said merging of the 2D and 3D image data can also be blending, addition, differentiation, or some other image-processing operator, which offers the user or the treating physician added diagnostic value that is better matched to the respective patient or more case-related.

Figure 5:
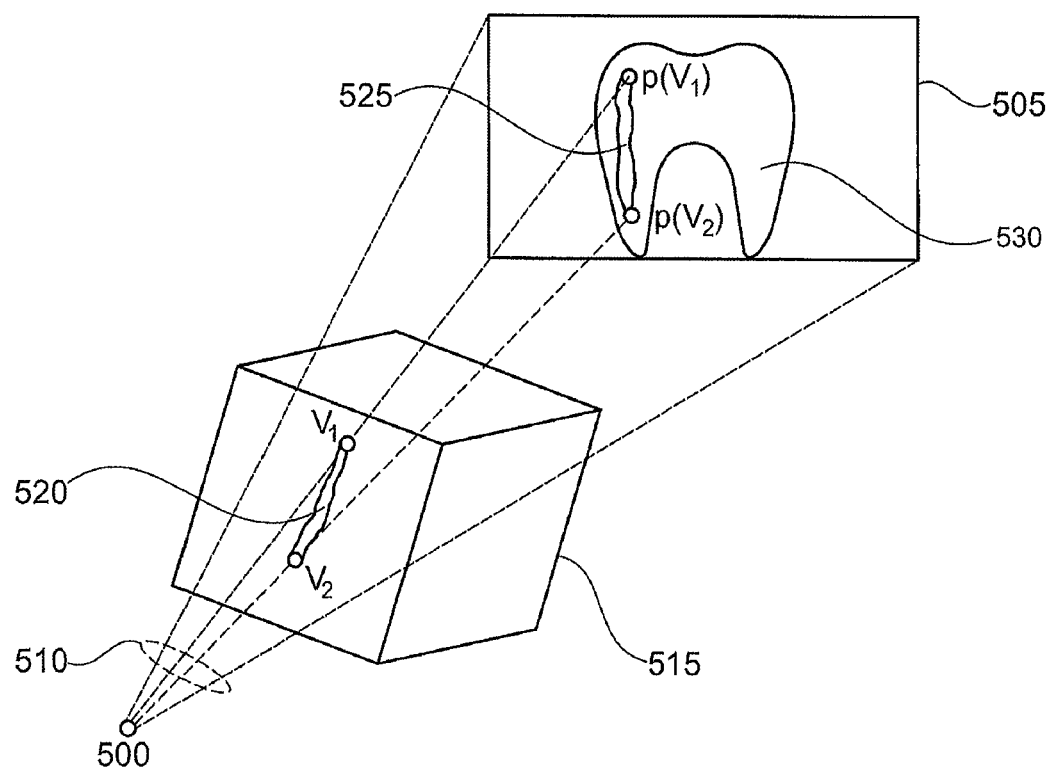
FIG. 5 schematically shows an allocation according to the invention of image points in a three-dimensional space to image points of a two-dimensional projection surface.

For said geometric merging of the 2D and 3D image data, image points in a three-dimensional (3D) space can be allocated to image points of a two-dimensional (2D) projection surface. Such an allocation is schematically depicted in FIG. 5. A beam 510, in this case with a pyramidal field of view, emitted by a radiation source 500 is acquired by a 2D detector 505. A partial volume, which represents an object 530 depicted in 2D, is designated as 515. The spatial point distribution ("point cloud") 520 with end points V1 and V2 schematically plotted in the partial volume 515, can be allocated to the flat point distribution ("point cloud") 525 with corresponding end points p(V1) and p(V2) by means of the 2D detector 505. Said image points in said 2D space 525 and said image points 520 in the 3D space can also represent points on image areas, whereby planes, curved surfaces or even individual points or point clouds can be included. The image areas are preferably flat surfaces.

Figure 2:
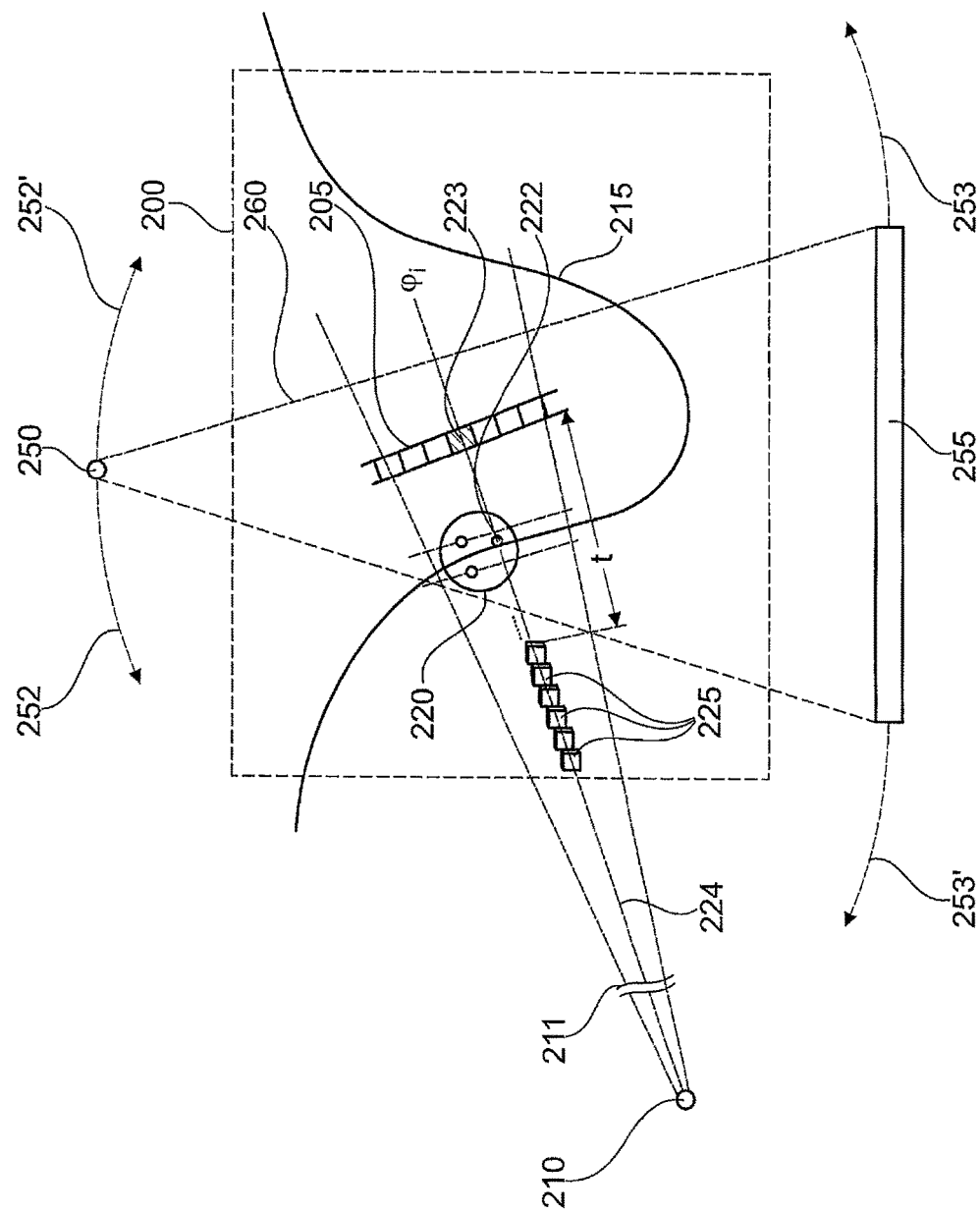
FIG. 2 shows a geometric measuring arrangement for acquiring said two-dimensional IO image.

FIG. 2 shows a geometric imaging or projection situation similar to FIG. 1 for acquiring said two-dimensional IO image, but the present representation includes only the sectional plane with a 3D image data layer ("tomogram") 200, which will be described later and is composed of two-dimensional individual images that are respectively acquired as x-ray images at the location of a detector 255. Such a tomogram 200 is then established from the sum of all acquired individual images.

Indicated again are an x-ray detector 205 disposed in the oral cavity of a patient, a corresponding radiation source 210, schematically simplified the mandibular arch 215 of the patient as well as, in the present example, only one single object to be irradiated or examined, namely only one single tooth 220 of the patient. The reference numeral 211 again signifies that the radiation source 210 is disposed substantially further away from the detector 205 than is shown in this illustration.

For the three-dimensional image acquisition by means of said DVT method, an x-ray tube 250 and an opposite digital (two-dimensional) image sensor or detector 255 that has an x-ray-sensitive scintillator layer, rotate 180 to 360 degrees around the (not depicted) patient 252, 252', 253, 253'. In doing so, the rotating x-ray tube 250 emits a cone-shaped, mostly pulsed x-ray beam with a (spatial) beam fan 260. During the revolution of the x-ray tube 250, a plurality of said two-dimensional tomograms 200 is acquired and a 3D image data set is obtained from these x-ray images in a per se known manner.

It must be emphasized that, in the imaging situation depicted in FIG. 2, i.e. at the time of acquisition of the present tomogram 200, the x-ray tube 250 is located above the (imaginary) paper plane and the detector 255 is located below the (imaginary) paper plane.

An object substructure 222 disposed in the lower region of the tooth 220 in the example scenario depicted in FIG. 2 represents one of three root canals of the tooth 220. With reference to this substructure 222, a radiation level 223 present at the detector 205 is obtained as the radiation integral $\varphi(i)$ via the i volume elements vi 225 disposed along the corresponding beam path 224, which are known in particular from the 3D image data of the depicted image data layer. The radiation absorption respectively occurring in the individual volume elements vi 225 thus results overall in an attenuation (in the case of x-rays, an x-ray attenuation) of the beam emitted by the radiation source 210 for the considered angle segment $\varphi$ 223 of the detector 205 in accordance with the following equation (1), the so-called law of attenuation, in which the integral $\int$ is formed over the i volume elements lying in the entire beam path 224:

$$\varphi(i) = IO^* \exp(-\int v i dv) \qquad (1)$$

whereby TO describes the measured radiation in the detector unit for a measuring situation in which there is no absorption and the measurement results are considered only monoenergetically.

The volume elements vi 225 depicted in FIG. 2 lie outside a profile depth t 228. Therefore, according to equation (1), for this profile depth at the detector segment i, the resulting radiation attenuation value D(i) is $$D(i) = IO^* \exp(-\int v i dv), \qquad (2)$$

whereby i≠t. With the aid of equation (2), by combining the 2D image data with the 3D image data, an IO image for a specific profile depth t can thus be calculated. On the basis of the projection situation, which also results from the 3D image data and is depicted in FIG. 2, based on the knowledge of the relationship between all i volume elements along a beam path 224, and on the basis of the integral IO image data present at the end of the beam path 224, the beam damping or attenuation components of one or more volume elements can be deducted or subtracted from the IO image data. Such volume elements may be undesirable objects or structures or disturbances, e.g. bone parts of a jaw. The evaluation of equations (1) and (2) can additionally be refined with knowledge of the spectrum and observation for every energy level, for example, by including all energy levels of the x-ray spectrum as follows:

$$\varphi\_Total(i) = \int IO(E)^* \exp(-\int vi(E) dv) dE \qquad (3)$$

If there are no suitable spectral values, an average spectrum can preferably be taken into account monoenergetically in accordance with equations (1) and (2).

Figure 3:
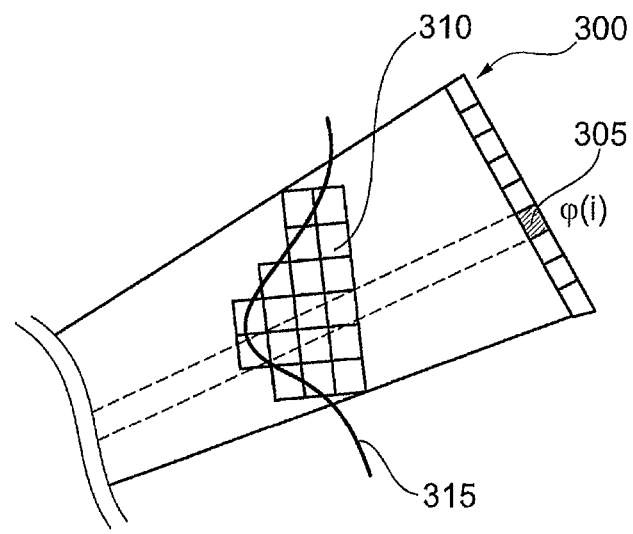
FIG. 3 shows a section of the measuring arrangement depicted in FIG. 2 to illustrate volume elements located in the beam path.

In order to be able to improve the IO image quality of the tooth 220 or root 222 depicted in FIG. 2, as shown in FIG. 3 for a plurality of beam paths, only the volume elements with the maximum absorption for this tooth 220 or root 222 along the respective beam path 224 can be taken into account for the calculation of a correspondingly corrected IO image, and all the other volume elements can be masked or arithmetically deducted from the original IO image data.

FIG. 3 shows a section of the measuring arrangement shown in FIG. 2 for the purpose of illustrating the measurement curves for all beam paths within the beam, which arise in total at the detector 300 as a result of the presence of absorptive volume elements in the respective beam path. The considered angle segment $\varphi(i)$ 305 depicted in FIG. 2 can be seen again FIG. 3. The depicted volume elements 310 overlap the tooth 220 shown in FIG. 2. In order to therefore display the tooth 220 on the detector 300 with the improved image resolution according to the invention, only these volume elements 310 are included in the IO image data; all other volume elements located in the beam path are masked. The plotted envelope curve 315 represents the maximum line along the different (adjacent) angle segments $\varphi(i)$ present at the detector 300 for this object 220.

Figure 4:
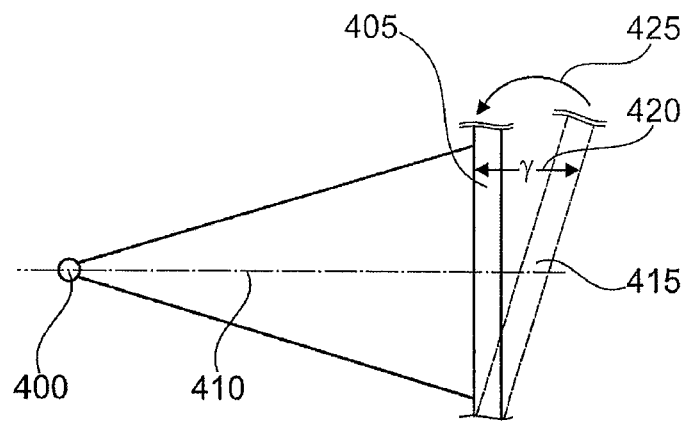
FIG. 4 shows a design example of a later correction according to the invention of a two-dimensional IO image, which is required because of a spatial tilting of the detector relative to the radiation source that occurred during imaging.

FIG. 4 shows a design example of a later correction according to the invention of an IO image, which is required because of a spatial tilting of the detector relative to the radiation source or the optical axis of the beam that occurred during imaging. The invention makes use of the fact that the 3D image data makes the determination of the exact orientation of the detector possible. Image distortions caused by said tilting can thus be corrected later.

FIG. 4 again shows a measuring arrangement or projection situation with a radiation source 400 and a radiation detector 405. The optical axis 410 defined by the beam cone is shown as well. Ideally, the detector would assume the depicted position 405, whereby, in comparison to the ideal orthogonal arrangement, the detector 405 in the present measuring situation is tilted 415 relative to the optical axis 410 by a tilt angle $\gamma$ 420. It must be noted that the tilt angle 420 in this representation is formed only in the paper plane. In reality, however, it can also contain an angle component formed perpendicular to the paper plane, whereby said spatial information is obtained from the 3D image data.

An angle transformation corresponding to the arrow 425 performed according to the invention reverses the image distortions caused by the tilting 420.

In order to perform a corresponding correction calculation, an orthogonal virtual detector 405 is defined, which fulfills a tilt angle $\gamma$ in such a way that the normal of the new detector can describe a straight line through the midpoint of the emitter. All the information available on the original detector is then projected back into the space that is covered by the beam cone from the emitter 400, by means of an unfiltered back projection. This information is preferably buffered or cached in a highly sampled discrete voxel space, to then, by means of a virtual projection along virtual beams 410 in accordance with equations (1) and (3) in a second step, produce a virtual corrected image at the location 405.

In order to reduce interpolation artifacts and aliasing caused by the grid of the buffered volume, an extended, non-punctiform emitter 400 can preferably be used in the simulation of the x-ray image 405.

The invention makes improved measurements or improved measurability in 2D possible, also compared to the state of the art. Depth information cannot be determined or obtained from a 2D x-ray image, in particular from an IO image, because the position of the object and the arrangement of emitter and detector can vary; therefore, unknown magnifications and distortions can occur. The length of a tooth or the width of a periodontal gap can thus only be estimated. If a specific profile depth is assigned to the tooth or the periodontal gap in 3D, however, the length can be determined there, preferably in mm, and made accessible in a corresponding, generally a correspondingly distorted, 2D image by means of a measuring tool.

Depending on the reconstruction technique, said 3D volume information is obtained from a series of 2D projections. In order to correct 3D volumes, the IO image can be added to individual existing volume elements along the beam path of every detector-image pixel, e.g. by means of a filtered back projection. For this purpose, to be able to utilize the higher resolution of the IO image, it is expedient to sample the volume in the respective region being considered at an increased rate. Since the blurring or back projection occurs only from one direction, the weight (0-100%) of the back projection must be increased, so that the user can set the comparison for the change in resolution, for example, dynamically. It is also possible, similar to the described profile depth variation in 2D, to define a group of voxels, and to apply the back projection only to the thus defined group so as to transfer the additional resolution only locally to the volume of a single tooth, for example. Since the blurring or back projection takes place only from one direction, only one increase in resolution orthogonal to the direction of the projection is obtained.

A described correction of 3D image data (e.g. DVT) using 2D image data (e.g. IO image) takes place according to the aforementioned method of back projection, for example, and/or according to the likewise known method of "radon transformation."

The described method can be realized in the form of a control program for an image generation or image display system in consideration here, or in the form of one or more corresponding electronic control units (ECUs).

The invention claimed is:

1. Method for processing image data of a dental image generation system, comprising the steps of:
   producing two dimensional image data with a first image generating unit, and producing three-dimensional image data with a second image generating unit,
   calculating a correlation between a position and orientation of a detector and a radiation source in relation to a three-dimensional object to be examined,
   calculating a profile depth using profile depth variation in order to determine which objects in a beam path from the radiation source to a given image point make what contribution,
   wherein the first image generating unit has a higher resolution than a resolution of the second image generating unit,
   wherein for an object to be examined the image generation system provides both two-dimensional image data and three-dimensional image data,
   wherein the two-dimensional image data and the three-dimensional image data are merged with one another,
   wherein the three-dimensional image data is merged by an image-processing operator on a basis of geometric imaging conditions, and wherein the merging is performed geometrically on a basis of a 2D/3D registration.

2. Method according to claim 1, wherein the image data resulting from the merging is visualized.

3. Method according to claim 1, wherein the image-processing operator is created to merge the two-dimensional image data and the three-dimensional image data by blending, addition or subtraction, by weighted addition or weighted subtraction, or by a combination thereof.

4. Method according to claim 1, wherein for merging the two-dimensional and the three-dimensional image data, image points in a three-dimensional space are allocated to image points on a two-dimensional projection surface.

5. Method according to claim 4, wherein at least one image area formed from said image points and with a maximum coincidence with the two-dimensional projection surface is identified in the three-dimensional space by means of an optimizer and on the basis of a quality measure.

6. Method according to claim 5, wherein in the identification of an image area with a maximum contribution to the two-dimensional projection surface, three-dimensional image elements are evaluated, which are located in a virtual beam path at a specific distance between a radiation source of the image generation system and said image generating unit.

7. Method according to claim 6, wherein in said evaluation, an image element with a maximum contribution or a specific group of image elements with a maximum contribution is identified.

8. Method according to claim 5, wherein at least one structure present in at least one image area during image generation and affecting the beam produced by a radiation source is subtracted out of the two-dimensional image data later using the three-dimensional image data.

9. Method according to claim 1, wherein for a merging of the two-dimensional image data, the image content of the two-dimensional image data for a presettable profile depth of a virtual projection of all volume elements lying in a presettable beam path is subtracted from the preset profile depth.

10. Method according to claim 9, wherein the evaluation of the volume elements is performed on the basis of a radiation integral $\varphi(i)$, wherein a radiation absorption of the beam emitted by the radiation source effected by volume elements disposed along the beam path is calculated for a considered angle segment $\varphi$ of the detector on the basis of a law of attenuation.

11. Method according to claim 1, wherein to merge the three-dimensional image data, the image content of the two-dimensional image data for a specific beam path of a radiation source is calculated on the basis of a filtered back projection.

12. Method according to claim 1, wherein a tilting of a radiation detector relative to the optical axis of the beam produced by a radiation source present during image generation of the two-dimensional image data is corrected by means of a perspective correction on the basis of three-dimensional image data.

13. Method according to claim 8, wherein a specific image area or specific group of image areas of a three-dimensional image represented by three-dimensional image data, which provides a maximum contribution to a two-dimensional image, is used as the measuring space for true-to-scale measurement in the two-dimensional image.

14. Method according to claim 1, wherein three-dimensional image data is merged with higher-resolution two-dimensional image data, in order to improve the spatial resolution of the three-dimensional image data perpendicular to the projection direction.

15. A non-transitory computer-readable storage medium storing a program which, when executed by a computer system, causes the computer system to perform the method according to claim 1.

16. Dental image generation system, which is configured to be controlled by the method according to claim 1.

* * * * *